United States Patent [19]

Smith et al.

[11] Patent Number: 5,637,278
[45] Date of Patent: Jun. 10, 1997

[54] TREATMENT DEVICE

[75] Inventors: Robert M. Smith, Bechin; John E. Adams, By Montrose, both of Scotland; James E. Delves, Bristol, United Kingdom

[73] Assignee: Merpro Tortek Limited, United Kingdom

[21] Appl. No.: 382,025

[22] PCT Filed: Jul. 13, 1993

[86] PCT No.: PCT/GB93/01460

§ 371 Date: Jul. 26, 1995

§ 102(e) Date: Jul. 26, 1995

[87] PCT Pub. No.: WO94/03254

PCT Pub. Date: Feb. 17, 1994

[30] Foreign Application Priority Data

Aug. 10, 1992 [GB] United Kingdom ............... 9216905
Feb. 1, 1993 [GB] United Kingdom ............... 9301958
Feb. 26, 1993 [GB] United Kingdom ............... 9303959

[51] Int. Cl.$^6$ ............... B01J 8/22; B01D 24/36; B01D 24/46
[52] U.S. Cl. ............... 422/144; 422/145; 422/147; 422/213; 210/274; 210/275
[58] Field of Search ............... 210/269, 274, 210/275, 189, 190, 512.1, 670, 675, 676, 677, 788, 792, 793; 422/140, 144, 145, 147, 213, 218

[56] References Cited

U.S. PATENT DOCUMENTS

| B 492,716 | 3/1976 | Morimoto et al. | |
|---|---|---|---|
| 3,282,426 | 11/1966 | Entringer | 210/189 |
| 3,788,985 | 1/1974 | Juntgen et al. | 210/676 |
| 4,412,919 | 11/1983 | Ueda | |
| 4,441,998 | 4/1984 | Ueda | 210/275 |
| 4,900,434 | 2/1990 | Schade | 210/275 |
| 5,213,683 | 5/1993 | Mann | 210/189 |
| 5,277,829 | 1/1994 | Ward | 210/274 |

FOREIGN PATENT DOCUMENTS

| 1433351 | 2/1966 | France . |
| 1072969 | 1/1960 | Germany . |

Primary Examiner—Robert J. Warden
Assistant Examiner—E. Leigh Dawson
Attorney, Agent, or Firm—Andrus, Sceales, Starke & Sawall

[57] ABSTRACT

A treatment device such as a filter device, containing a treatment bed (2) of particulate treatment medium. A fluidizing unit (9) associated with the treatment medium particles, for removing the treatment medium particles from the treatment bed for rejuvenation. The fluidizing unit (9) comprises a liquid supply duct (11) having an outlet (10) and which is arranged to be fed with liquid under pressure from outside the filter bed, and a discharge duct (14) having an inlet (15) and which projects beyond the outlet (10) of the liquid supply duct.

19 Claims, 5 Drawing Sheets

TREATMENT DEVICE

The present invention relates to a treatment device of the kind having a particulate treatment bed for the treatment of a liquid flowing through the treatment bed.

The particulate treatment medium has to be periodically rejuvenated which generally requires the treatment device to be taken off line while it is backwashed in situ, or the treatment medium is removed for rejuvenation or is replaced, leaving the treatment device out of action for considerable periods.

According to the present invention a treatment device comprises a housing containing a treatment bed of a particulate treatment medium, and having an inlet for liquid to be treated and a treated liquid outlet; a fluidising unit, associated with the treatment medium, for removing the treatment medium particles from the treatment bed, the fluidising unit comprising a liquid supply duct having an outlet and which is arranged to be fed with liquid under pressure from outside the filter bed, and a discharge duct within the liquid supply duct, having at its end an inlet and projecting beyond the outlet of the liquid supply duct, for the discharge of liquid and treatment medium particles from the bed; and means for supplying new particulate treatment medium to the top of the bed.

Such a fluidising unit ensures that the treatment medium particles can be removed efficiently from the bed without contacting a pump impeller. The treatment medium removed through the discharge duct is replaced by particles from above which fall under gravity or pressure into the space created by the evacuation of the treatment medium. In this way the treatment medium will tend to progress down through the treatment bed, ensuring that all of the bed can be cleaned cyclically.

The material which has been removed from the bed may be lead to a rejuvenating means, wherein it is rejuvenated and reused, or may be disposed of or made use of elsewhere. For example if the particles of the treatment medium are combustible, the treatment might be to filter and hence de-oil oily water, thereby increasing the calorific value of the particles and enabling them to be used as a fuel.

It is therefore possible gradually to remove the particulate treatment medium from the treatment bed for rejuvenation while the treatment device is still on line.

Fluidising units of a type suitable for use in the present invention are disclosed in our earlier U.S. Pat. Nos. 4,978,251, 4,952,099 and 4,992,006.

The operation of the fluidising unit may be improved if the liquid supply duct has means for swirling the liquid.

Preferably the fluidising unit is situated near the bottom of the treatment bed so that the treatment medium removed through the discharge duct is replaced by particles from above which fall under gravity or pressure into the space created by the evacuation of the treatment medium. In this way the treatment medium will tend to progress down through the treatment bed ensuring that all of the bed is cleaned cyclically.

The treatment device is particularly effective as a filter device wherein the rejuvenating means is a separator for separating contaminants from the treatment medium.

Conventional filters have to be backwashed when the filter bed becomes clogged by contaminants. This requires liquid to be drained from the filter bed, air to be blown through the bed to break it up and water to be passed back through the bed to wash out the contaminants. This not only causes the filter to be off line for long periods but also results in lost water and some lost particles of filter medium.

The use of the treatment device of the present invention as a filter provides rapid on-line cleaning of the filter medium. This leads to the advantage that a filter medium having a small particle size or a shallow bed can be used as, due to the speed of cleaning, the solids holding capacity is less important than with a conventional filter. The filter medium washed out through the discharge duct is cleaned and may be returned to the original or another filter bed. This reduces the net amount of filter medium lost from the system. The need for air to be blown through the filter is removed as the pressure of the liquid fed to the fluidising unit breaks up the bed. The frequent cleaning which can be achieved using the invention reduces the opportunity for channelling to occur.

The separator for separating contaminants from the treatment medium is preferably a hydrocyclone. In certain modes of operation it is desirable that this generates sufficient pressure at the outlet, through which the filter medium leaves, to carry the cleaned filter medium back to the filter bed. If necessary, the filter medium entering the hydrocyclone can be boosted by an additional supply of high pressure water to the inlet of the hydrocyclone. Depending on the relative particle sizes or specific gravities of the filter medium and contaminants, the cleaned filter medium outlet may be either the underflow outlet or the overflow outlet of the hydrocyclone.

Alternatively the treatment device could be an ion exchange device with a particulate ion exchange resin providing the treatment medium.

The treatment device may have an inlet for contaminated water above the treatment bed so that the contaminated water comes into contact with the treatment medium at the medium/liquid interface near the top of the housing. The capacity of the device is then substantially dictated by the size of this interface area. It is therefore preferable that the inlet for liquid to be treated is provided at the outer periphery of the bed so that the liquid percolates inwardly through the treatment medium to an outlet which is embedded within the bed. In this case, it is desirable that the inlet for liquid to be treated opens into a first space defined by the inside of the wall of the housing and a first screen provided with openings which allow the liquid to be treated but not the particulate treatment medium to pass therethrough, and the treated liquid outlet associated with a second screen having openings which allow the treated liquid but not the particulate treatment medium to pass therethrough.

This allows the interface area between liquid to be treated and treatment medium to be increased without increasing the diameter of the housing. This is important in applications where floor space is at a premium, such as on an oil production platform. Also the weight of the treatment device according to the present invention will be less than a conventional device of the same capacity.

The manufacturing cost of the housing is largely dependent on the cost of manufacturing the vessel nozzles and ends. Increasing the length of the housing in the present invention can increase its capacity without altering the diameter which is generally cheaper than increasing the capacity by increasing the vessel diameter.

Preferably the side wall of the housing forms a hollow cylindrical cavity and the first space is an annulus, the inner side of which is provided by the first screen forming a hollow cylindrical cavity, for receiving the particulate treatment medium, coaxial with the side wall and having a radius less than the radius of the side wall; and the second screen encloses a space communicating with the treated liquid outlet and extending along the axis of the cylinder.

This construction ensures that there are no stagnant zones in the treatment device which would allow bacteria to grow and multiply. Concrete and other filler material used in other devices to fill stagnant zones are not necessary which gives a further weight advantage.

The inlet for liquid to be treated is preferably situated in the side wall of the housing. However, in order to increase further the medium/liquid interface, a portion of the liquid to be treated may be fed into the housing through a second inlet for liquid to be treated in the top of the housing.

Alternatively, the inlet and outlet can be reversed so that the outlet is provided at the outer periphery of the bed so that the liquid percolates outwardly through the treatment medium from an inlet which is embedded within the bed.

There may be means for conveying the rejuvenated treatment medium particles back to the treatment bed of the same device, these means preferably comprising a return duct leading from the outlet of the separator to the treatment bed. This ensures direct recycling of the treatment medium.

A plurality of the treatment devices may be connected in parallel in a treatment system. Such a system may operate in a variety of modes. For example, if inflow is predictable, one or more treatment devices may be on-line at any time while one or more other treatment devices are off-line for rejuvenation of the treatment medium. The rejuvenated treatment medium may then be recycled to the treatment device from which it has been extracted, or to a different, for example, initially empty, treatment device. A treatment device with rejuvenated treatment medium is then ready to be brought back on line again. The use of a system with a plurality of treatment devices also enables surges in the inflow of contaminated liquid to be accommodated.

BRIEF DESCRIPTION OF THE DRAWINGS

Examples of treatment devices constructed in accordance with the present invention will now be described with reference to the accompanying diagrammatic drawings, in which.

Figure 1:
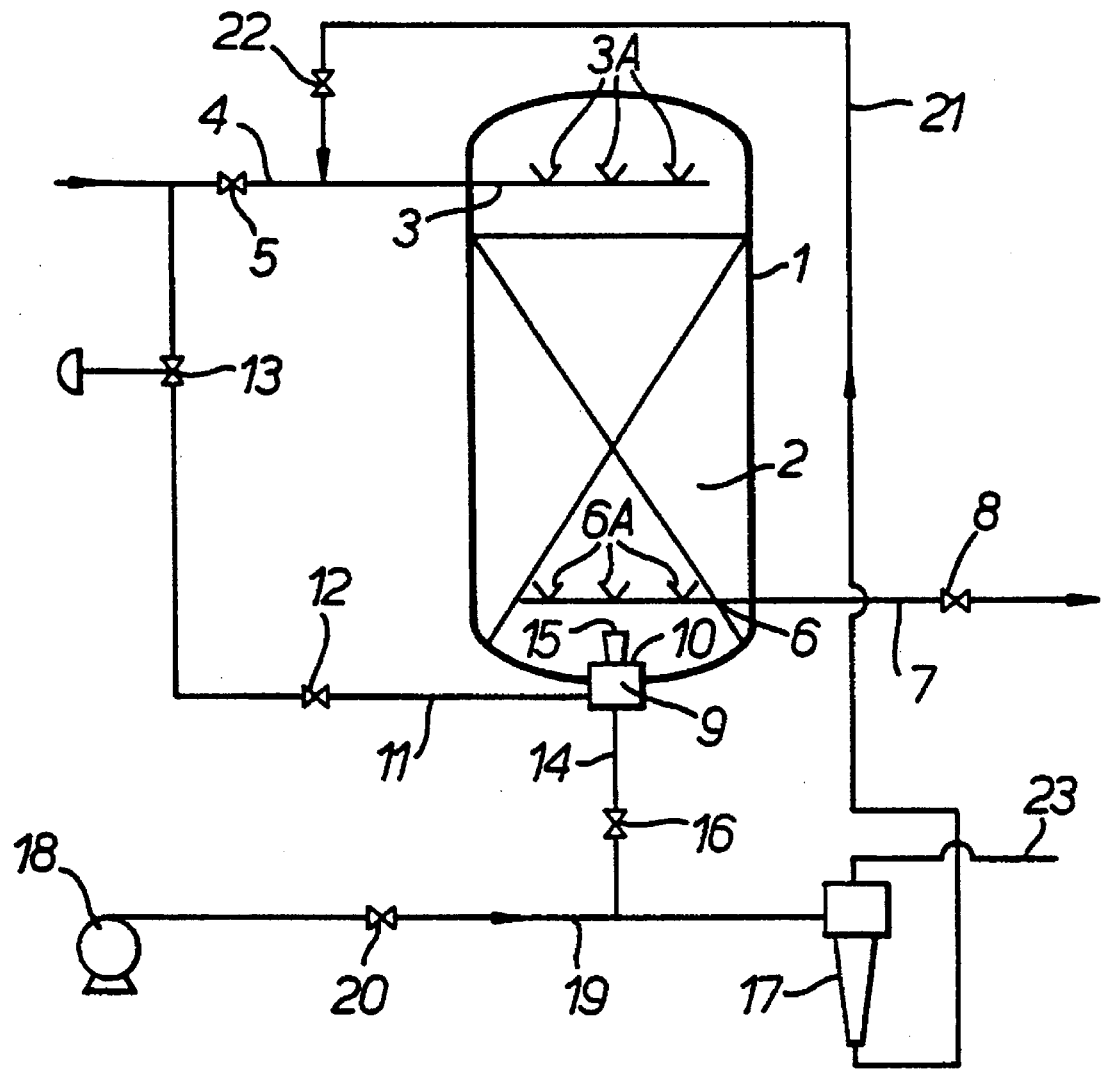
FIG. 1 is a diagram of a filter device and its associated circuit.

A filter device comprises a housing 1 filled with a bed of a particulate filter medium 2 such as sand or garnet. The housing 1 is a pressure vessel which will normally operate at a pressure of at least $5 \times 10^5$ Pa. An inlet manifold 3 with a plurality of perforated, spaced apart inlets 3A, is provided towards the top of the housing 1 and is fed by an inlet pipe 4, which conveys contaminated liquid to the inlet manifold 3 and is controlled by an inlet valve 5. An outlet manifold 6 with a plurality of traps 6A is provided towards the bottom of the housing 1 and feeds into an outlet pipe 7 the flow through which is controlled by an outlet valve 8.

In normal use, the inlet 5 and outlet 8 are open and contaminated liquid is fed through the inlet pipe 4 and is dispersed around the top of the housing by the manifold 3. The liquid permeates down through the filter medium 2 which traps the contaminants. The cleansed liquid reaches the traps 6A and is fed to the outlet pipe 7.

Alternatively, the filter may act in an upflow mode with the contaminated liquid inlet manifold 3 at the bottom, and the cleaned liquid outlet manifold at the top, of the bed.

Figure 2:
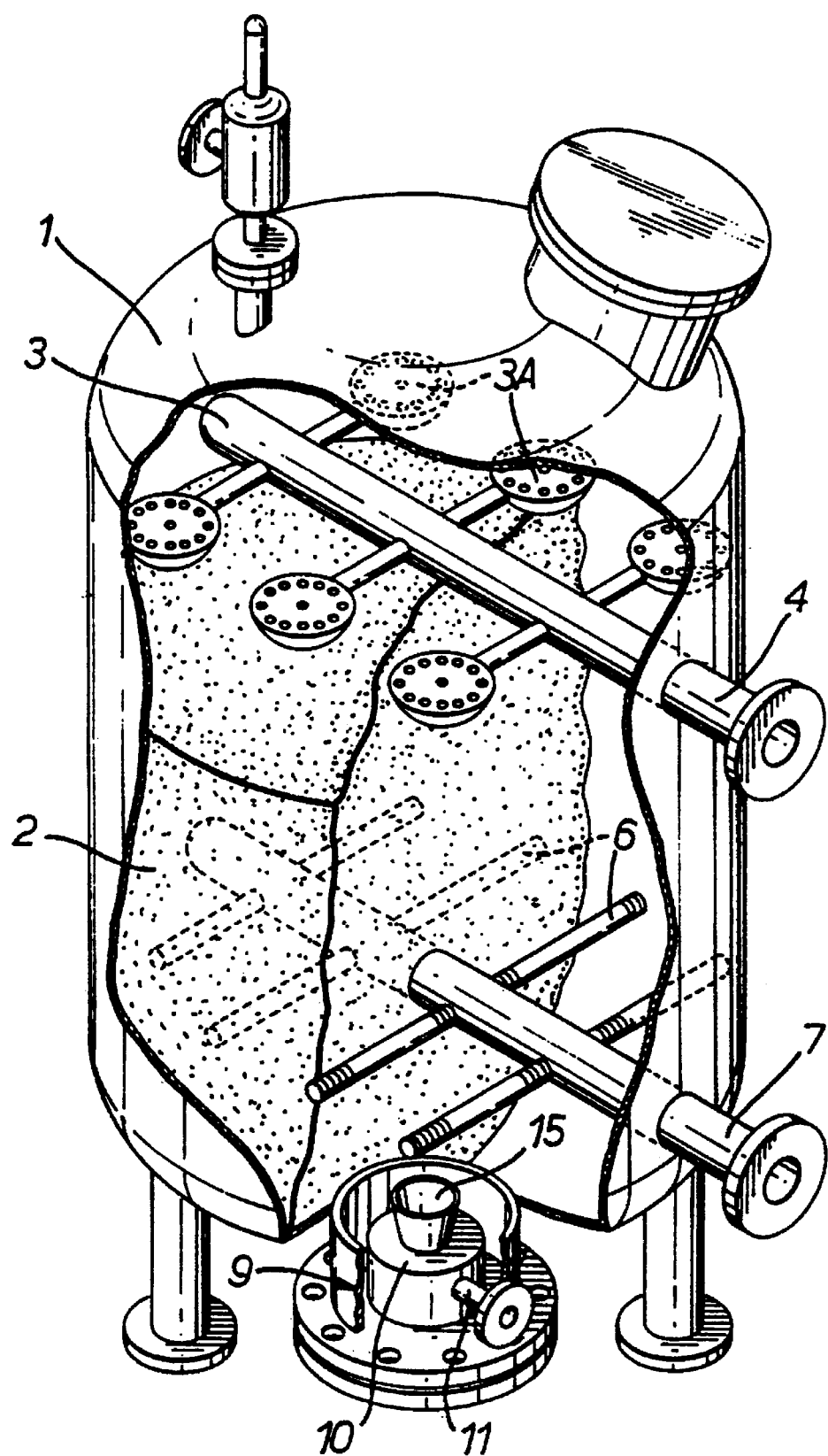
FIG. 2 is a cut away perspective view of a first example of a filter device.
Figure 3:
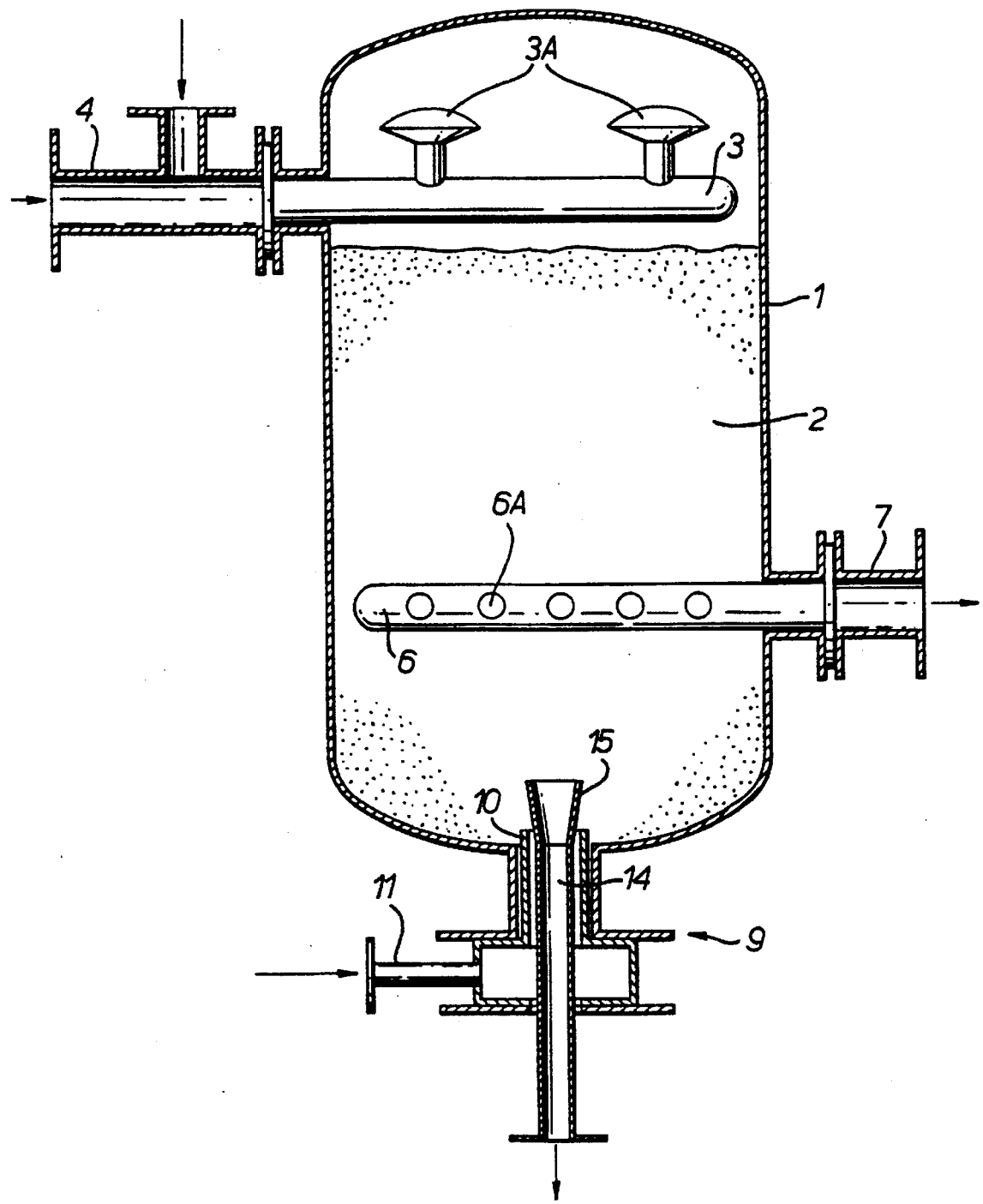
FIG. 3 is an axial section of a filter device similar to that shown in FIG. 2.

A fluidising unit 9 is mounted in the base of the housing 1 as shown in FIGS. 1 to 3. The unit has a liquid outlet 10 which is fed with contaminated liquid for cleaning the bed by a liquid supply duct 11 connected to the inlet pipe 4, the flow being controlled by a valve 12. An additional optional valve 13 may be provided to vary the rate of flow of liquid through the duct 11. Alternatively, filtered liquid can be used as the cleaning liquid. A discharge duct 14 is located within and is coaxial with the liquid supply duct 11, and terminating in a discharge inlet 15 which projects above the liquid supply duct. The flow through the discharge duct 14 is controlled by a valve 16. The discharge duct 14 is controlled by a valve 16. The discharge duct 14 leads to a hydrocyclone 17 and is connected to an inlet of the hydrocyclone which is directed tangentially to the wall of the hydrocyclone. A supply of high pressure water 18 is also connected to the inlet of the hydrocyclone 17 via a booster pipe 19 and valve 20. The underflow outlet of the hydrocyclone 17 is connected by a return pipe 21 back to the contaminated water inlet pipe 4 via a valve 22. The overflow 23 provides an outlet for contaminants.

Typically, the outlet 10 has a 45 mm bore, and the inlet has a 25 mm bore.

Although the fluidising unit is shown below the manifold 6, it may equally be positioned above it. The height of the fluidising unit may also be chosen so as to remove that part of the filter medium which traps contaminant particles of a certain size, whilst leaving the main, heavier base of the filter bed.

When it is desired to clean the filter medium, valves 5 and 8 are closed and valve 12 is opened allowing a flow of water under pressure to the liquid supply duct 11 and into the filter medium 2 through outlet 10. The water may be caused to swirl in the liquid supply duct. The filter medium 2 thus becomes fluidised and travels down through the discharge inlet 15 of the discharge duct 14 and into the hydrocyclone 17. The filter medium above that which has been discharged will fall under gravity and will in turn be fluidised and travel through the discharge duct 14.

Alternatively, the valves 5 and 8 may be left open and the fluidising unit 9 may constantly, slowly remove the filter medium. This recycles the bed in a slow and controlled manner and removes the need to take the filter device off line for the backwash operation.

In the hydrocyclone, the filter medium together with its associated contaminants is caused to swirl. The swirl is boosted by the supply of high pressure water from the supply 18. The swirling motion will cause the contaminants to migrate to the top of the hydrocyclone where they are discharged for disposal through overflow 23. The cleaned filter medium particles together with most of the liquid travel downwards at the wall of the hydrocyclone and through the underflow outlet at such a pressure that they are forced along the return pipe 21 and back into the housing 1 via the inlet pipe 4 and manifold 3.

Figure 4:
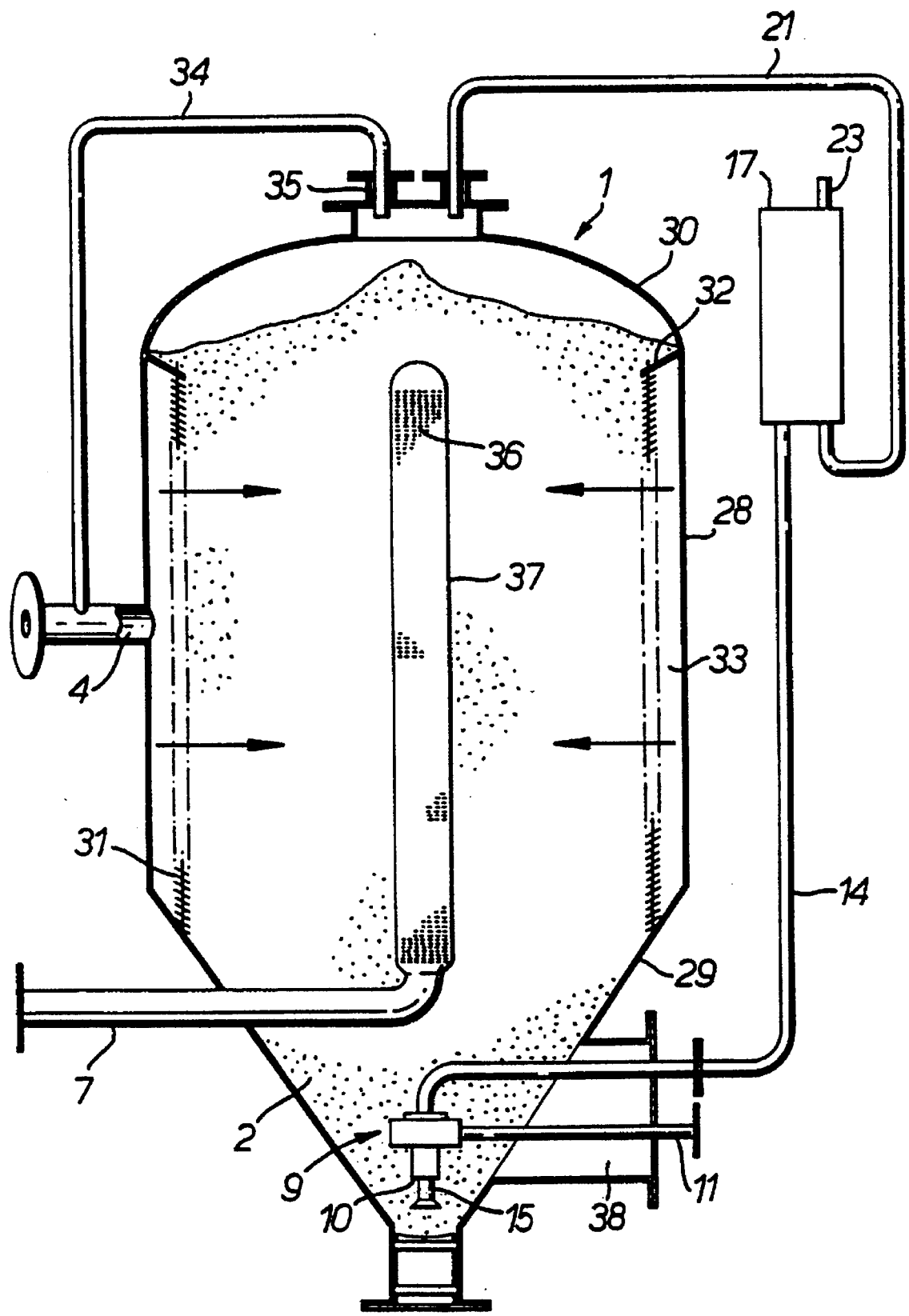
FIG. 4 is an axial section of a second example of a filter device.

The filter device of the second example shown in FIG. 4 comprises a housing 1 having a cylindrical side wall 28 joining a hollow conical base 29 at one end and a curved upper wall 30 at the other. The housing 1 is typically a pressurised tank which will normally operate a pressure of at least $5 \times 10^5$ Pa.

A first screen 31 forming a hollow cylindrical space having a radius less than that of the side wall 28 is positioned within the housing 1 so as to be coaxial with the cylindrical wall 28. The first screen 31 extends from the conical base 29 along the length of the side wall 28 and is joined at its lower edge to the conical base 29 and at its upper edge to the side wall 28 of the housing 1 by a hollow frustoconical spacer 32. The first screen 31 and spacer 32 together with the side wall 28 and an upper part of the conical base 29 define a substantially annular space 33.

The inlet 4 for the contaminated liquid to be filtered is provided in the side wall 28 at a position approximately half way along the axial length of the wall to communicate with the space 33. A bleed off pipe 34 leads from the inlet 4 to a second inlet 35 in the upper wall 30 of the housing 1.

Extending along a substantial portion of the axis of the cylindrical side wall 28 is a second space 36 enclosed by a second screen 37 which is closed at its upper end and which communicates at its lower end with the filtered liquid outlet 7 extending out of the housing through the conical base 29.

The particulate filter medium 2 fills a space within the housing between the first space 33 and the second space 36 leaving a gap at the top of the housing.

The first 31 and second 37 screens are provided with a plurality of openings which are sized so as to allow a flow of contaminated liquid and filtered liquid therethrough respectively but to prevent the particles of the filter medium from passing therethrough. The screens 31, 37 may be wedge wire screens or louvres/slats which are angled radially and downwardly and spaced apart to prevent the filter medium from passing between adjacent louvres/slats as the liquid to be treated flows radially inwardly and downwardly between the louvres/slots.

The screens 31 and 37 may, in horizontal cross section, be formed of zig-zag shape, thereby increasing still further the effective cross section of treatment medium presented to the incoming or outgoing liquid.

Within the filter medium 2 in the conical base 29 of the housing 1 there is provided a fluidising unit 9, which opens downwardly and is constructed as described in the previous examples.

The ducts 11 and 14, which are connected to the fluidising unit 9, extend through a lateral entry port 38 near the bottom of the housing. The fluidising unit may be removable through this port 38 for servicing and replacement.

In use, the contaminated liquid to be filtered is fed into the housing through the contaminated liquid inlets 4, 35. The liquid entering through the first inlet 4 fills the first space 33 from where it flows through the first screen 31 into the filter bed 2. It is then filtered by the filter bed 2 as it flows in the direction of the arrows shown in FIG. 4 towards the second space 36 which it enters through the second screen 37 before leaving the housing through outlet 7. The contaminated liquid entering through the second inlet 35 fills the gap above the filter bed 2 and flows down through the filter bed 2 before it enters the space 36 and leaves the housing through outlet 7.

When it is desired to clean the filter medium the fluidising unit 9 and hydrocyclone 17 are operated as described with reference to the earlier examples.

Figure 5:
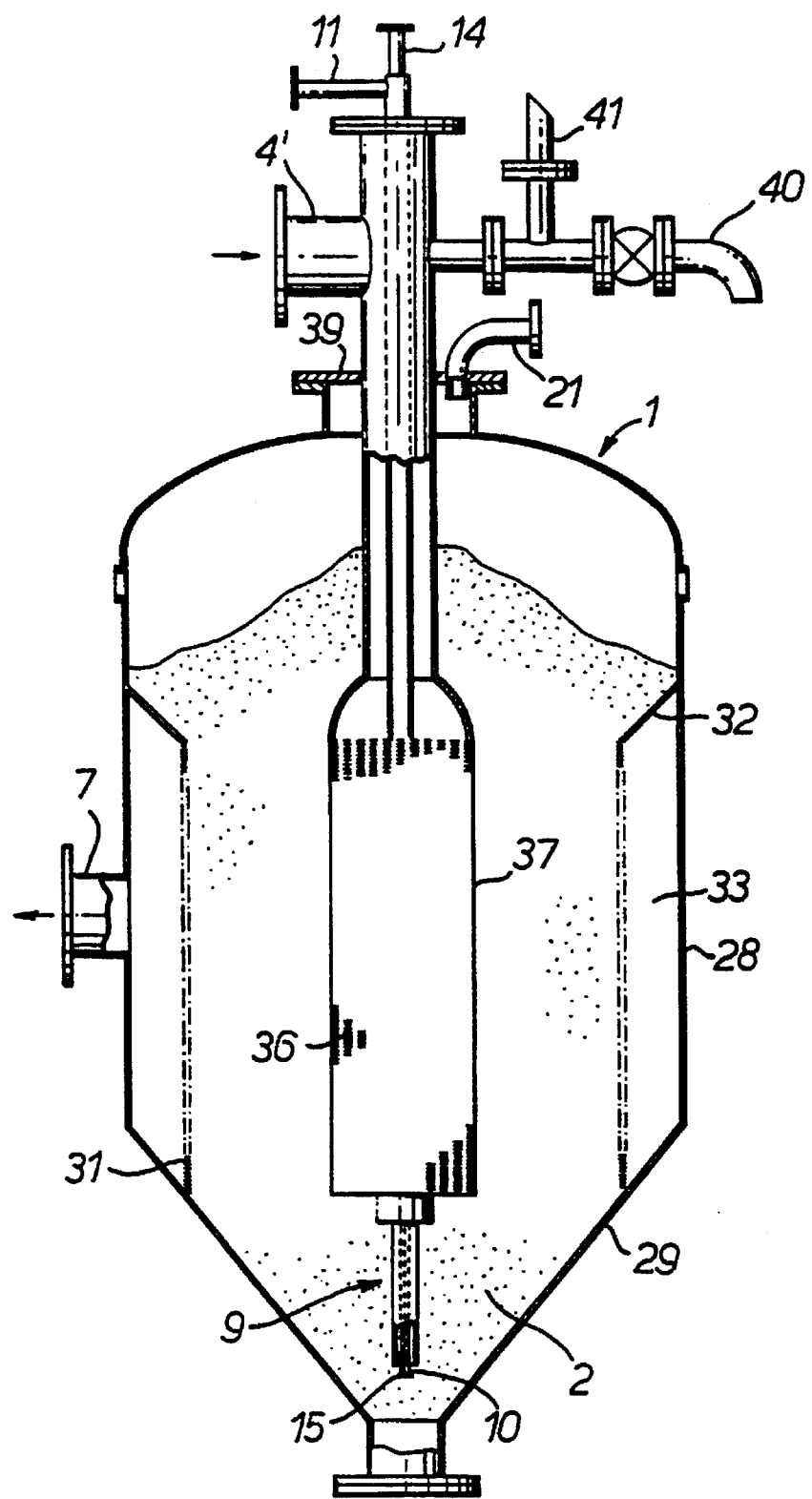
FIG. 5 is an axial section of a third example of a filter device.

A third example of a filter device is shown in FIG. 5. This differs from the second example in that the liquid supply duct 11 and discharge duct 14 of the fluidising unit 9 extend vertically upwards along the axis of the cylindrical side wall 28, through the second screen 37 and out through the curved upper wall of the housing 1. This allows both the screen 37 and fluidising unit 9 to be removed through a port 39 in the top of the housing.

The flow direction may be reversed such that the inlet 4' communicates with the space 36 within the screen 37. The inlet is provided with a bleed valve 40 and a safety valve 41. The liquid to be treated flows radially outwardly, through the first screen 31 into the space 33 and out through the outlet 7'.

The filter device may be provided with more than one fluidising unit each removing a different grade of filter medium.

Although the invention has been described with reference to a filter device, it is equally applicable to an ion exchange device. In this case, the particulate filter medium would be replaced by a particulate ion exchange resin and an ion regeneration stage would replace the separator.

We claim:

1. A treatment device comprising:
   a housing containing a treatment bed of a particulate treatment medium, said treatment bed having a top and a bottom, said housing having an inlet for liquid to be treated and a treated liquid outlet;
   a fluidizing unit positioned in said housing for removing the treatment medium particles from the bottom of the treatment bed, the fluidizing unit comprising;
   a liquid supply duct having a central axis and an annular outlet lying generally normal to said axis, said liquid supply duct being couplable to a fluidizing liquid source for supplying fluidizing liquid to said fluidizing unit at a point removed from said inlet for the liquid to be treated by said treatment device, said liquid supply duct discharging fluidizing liquid from said annular outlet into the bottom of the treatment bed, said liquid supply duct having means for imparting a swirl to the fluidizing liquid discharged from said liquid supply duct about said central axis for causing the treatment medium particles to be removed from said treatment bed by the fluidizing liquid; and
   a discharge duct within and coaxial with the liquid supply duct, said discharge duct having an open end for receiving liquid and treatment medium particles removed from the bed and for discharging same from said housing; and
   means for supplying new treatment medium to the top of the treatment bed to replace the treatment medium removed from the treatment bed by the fluidizing unit.

2. A treatment device according to claim 1, wherein the discharge duct (14) is coupled to a rejuvenating means (17) for rejuvenating the treatment medium, whereby the rejuvenated treatment medium can be reused.

3. A treatment device according to claim 2 wherein the treatment device is a filter device and the rejuvenating means is a separator (17) for separating contaminant from the treatment medium.

4. A treatment device according to claim 3, wherein the separator is a hydrocyclone (17).

5. A treatment device according to claim 4 wherein the hydrocyclone (17) has an outlet through which the treatment medium is discharged, and wherein said outlet is connected to said supplying means for supplying rejuvenated treatment medium to the top of the treatment bed.

6. A treatment device according to claim 4 wherein said hydrocyclone (17) has inlet means receiving liquid and treatment medium particles discharged from said housing, said inlet means being further connected to a source of additional, pressurized liquid.

7. A treatment device according to claim 2, wherein there is provided means (21) for conveying the rejuvenated treatment medium particles back to said new treatment medium supply means.

8. A treatment device according to claim 7, wherein the means for conveying the rejuvenated treatment medium particles back to the said new treatment medium supply means comprises a return duct (21) leading from an outlet of the rejuvenating means (17) to said new treatment medium supply means.

9. A treatment device according to claim 1, wherein the treatment device is an ion exchange device.

10. A treatment device according to claim 1, wherein the inlet for liquid to be treated is provided at the outer periphery of the bed so that the liquid percolates inwardly through the treatment medium to said treated liquid outlet which is embedded within the bed.

11. A treatment device according to claim 10, wherein the inlet (4) for liquid to be treated opens into a first space (33) defined by the inside of a wall of the housing (1) and a first screen (31) provided with openings which allow the liquid to be treated but not the particulate treatment medium to pass therethrough, and the treated liquid outlet (7) is provided with a second screen (37) having openings which allow the treated liquid but not the particulate treatment medium to pass therethrough.

12. A treatment device according to claim 11, wherein said wall (28) of the housing (1) is a cylinder and the first space (33) is an annulus, the inner side of which is provided by the first screen (31) forming a hollow cylindrical cavity within said side wall, for receiving the particulate treatment medium (2), coaxially with said wall and having a radius less than the radius of said wall; and the second screen (37) encloses a space (36) communicating with the treated liquid outlet (7) and extending along the axis of said cylindrical cavity.

13. A treatment device according to claim 12, wherein the inlet (4) for liquid to be treated is situated in a side wall (28) of the housing.

14. A treatment device according to claim 13, wherein a second inlet (35) for liquid to be treated is situated in a top of the housing.

15. A treatment device according to claim 11, wherein the treated liquid outlet is provided at the outer periphery of the bed so that the liquid percolates outwardly through the treatment medium from an inlet for the liquid to be treated which is embedded within the bed.

16. A treatment device according to claim 15, wherein the treated liquid outlet opens into a first space defined by the inside of a wall of the housing and a first screen provided with openings which allow the treated liquid to pass therethrough but which substantially blocks passage of the particulate treatment medium therethrough, and the inlet for the liquid to be treated is provided with a second screen having openings which allow the liquid to be treated but not the particulate treatment medium to pass therethrough.

17. A treatment device according to claim 16, wherein the wall of the housing is a cylinder and the first space is an annulus, the inner side of which is provided by the first screen forming a hollow cylindrical cavity within said wall, for receiving the particulate treatment medium, coaxially with the wall and having a radius less than the radius of the wall; and the second screen encloses a space communicating with the inlet for the liquid to be treated and extending along the axis of the cylinder.

18. A treatment device according claim 15, wherein the treated liquid outlet is situated in a side wall of the housing.

19. A system comprising a plurality of treatment devices according to claim 1 connected in parallel.

\* \* \* \* \*